US006459250B1

(12) United States Patent
Davis

(10) Patent No.: US 6,459,250 B1
(45) Date of Patent: Oct. 1, 2002

(54) DECORATIVE WALL PLATE SWITCH DIMMER MECHANISM

(76) Inventor: Ralph K. Davis, 4205 Mowry Ave. #51, Fremont, CA (US) 94538

( * ) Notice: Subject to any disclaimer, the term of this patent is extended or adjusted under 35 U.S.C. 154(b) by 0 days.

(21) Appl. No.: 09/815,224

(22) Filed: Mar. 21, 2001

(51) Int. Cl.[7] .................................................. H02J 3/12

(52) U.S. Cl. ......................... 323/352; 174/66; 200/333; 220/241; 307/140; 323/905

(58) Field of Search ................................ 200/252, 333; 220/241, 242; 307/139, 140, 157; 323/352, 905; 174/66

(56) References Cited

U.S. PATENT DOCUMENTS

| | | | | | |
|---|---|---|---|---|---|
| 3,103,618 | A | | 9/1963 | Slater | |
| 3,292,007 | A | | 12/1966 | Tiemann | |
| 3,300,711 | A | | 1/1967 | Duncan | |
| 3,331,013 | A | | 7/1967 | Cunningham | |
| 3,385,944 | A | | 5/1968 | Mackiewicz et al. | |
| 3,893,019 | A | | 7/1975 | King et al. | |
| 3,997,820 | A | | 12/1976 | Stefani | |
| 4,835,343 | A | * | 5/1989 | Graef et al. | 174/66 |
| 4,939,383 | A | * | 7/1990 | Tucker et al. | 200/335 |
| 5,998,747 | A | * | 12/1999 | Kelso et al. | 174/66 |
| 6,005,308 | A | * | 12/1999 | Bryde et al. | 200/335 |
| 6,051,787 | A | * | 4/2000 | Rintz | 174/66 |

* cited by examiner

*Primary Examiner*—Jessica Han
*Assistant Examiner*—Gary L. Laxton
(74) *Attorney, Agent, or Firm*—Gene Scott-Patent Law & Venture Group

(57) ABSTRACT

A circuit board provides a first elevation adapted for printing and bonding of conductor and resistor traces and monolithic ceramic capacitors, and provides through holes adapted for locating conductors. A second elevation is adapted for location and containment of a semiconductor quadrac. A third elevation is adapted for location and containment of a circuit board which is selectively adjustable through an R-C network coupled between the semiconductor quadrac and an input power source. An electric phase control uses mechanical movement for actuation. Provision is provided for mounting the phase control mechanism and the circuit so as to be manually accessed. A planar switch cover plate is adapted for sliding engagement, in parallel juxtaposition, with the mounting devices, the switch cover plate further adapted for engagement with the phase control mechanism for actuation through sliding engagement.

8 Claims, 5 Drawing Sheets

DECORATIVE WALL PLATE SWITCH DIMMER MECHANISM

BACKGROUND OF THE INVENTION

1. Field of the Invention

This invention relates generally to electrical switches and more particularly to a wall mounted light switch phase control with a movable flat plate decorative cover.

2. Description of Related Art

The prior art teaches the use of electric wall mounted controls but fails to teach a control that does not require a protruding control mechanism and that provides a planar outwardly unbroken surface that is easily cleaned by simple wiping. The present invention fulfills these needs and provides further related advantages as described in the following summary.

The manufacturing and assembly methods used in prior art lamp dimmers has remained relatively static since the introduction of the first phase controlled electronic dimming device. Two distinct methods of circuit construction have been dominant through out the production history. The first method constituted a circuit structure of packaged electronic component terminals interconnected by a flexible conductor and hand soldered for a permanent physical and electrical configuration. An example of this structure is an early patent to Slater, U.S. Pat. No. 3,103,618. This patent also describes the general operation of the phase control dimmer. A later patent to Tiemann, U.S. Pat. No. 3,292,007 describes a different component circuit arrangement than that used by Slater, but configured into the same electrical and physical arrangement by manual soldering as that used by Slater. Later patents, Mackiewicz et al, U.S. Pat. No. 3,385,944; Duncan, U.S. Pat. No. 3,300,711; Cunningham, U.S. Pat. No. 3,331,013, all employ the same circuitry interconnect method as that of Slater and Tiemann. These electronic circuits were then attached to housings by the use of metal fasteners such as screws, rivets, and eyelets, and the housings then assembled into a final configuration by use of the same type of fastening devices. The second method of circuit construction is best described by the utilization of packaged components with their electrical terminals inserted into a plurality of through holes contained on a printed circuit board so that all conductive portions of the components could be interconnected by a single soldering operation. King, et al, U.S. Pat. No. 3,893,019, and Stefani, U.S. Pat. No. 3,997,820 best show this method. These circuit assemblies and housing members of these patented devices were then made into a final configuration by the use of mechanical fasteners such as screws, eyelets, rivets and drive pins. The cost of the packaged electronic components have remained quite stable throughout production history, with the cost of assembly labor appreciating with changes in the minimum wage scale and inflationary pressures. This factor has prompted some domestic manufacturers to relocate their assembly process to lower cost labor areas.

SUMMARY OF THE INVENTION

The present invention teaches certain benefits in construction and use which give rise to the objectives described below.

A variable power wall mounted dimmer switch is provided having a low profile flat and movable cover plate with angular sides which serves as both the on-off control and the illumination control. The flat surface area of the cover plate is smooth and unbroken, having no circular or rectangular holes and no external fasteners. The circuitry construction uses a unique one piece circuit board having multiple elevations, employing Surface Mount Technology processing disciplines of Polymer Thick Film and Chip on Board which are referred to in this disclosure as, SMT, PTF and COB, and assembled into a final configuration that utilize inter-engaging mating parts for a more rapid assembly method than that used in prior art wall dimmers. The present invention provides an overall improvement in the size, cost, and esthetics over that associated with prior art wall dimmer devices.

A primary objective of the present invention is to provide an apparatus and method of use of such apparatus that provides advantages not taught by the prior art.

Another objective is to provide such an invention capable of presenting a planar unbroken surface to the user.

A further objective is to provide such an invention as a wall mounted dimmer switch for lighting.

A still further objective is to provide such an invention capable of simple and inexpensive construction by plastic molding processes and deposition of surface placed layers.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above described drawing figures illustrate the invention in at least one of its preferred embodiments, which is further defined in detail in the following description.

Figure 1:
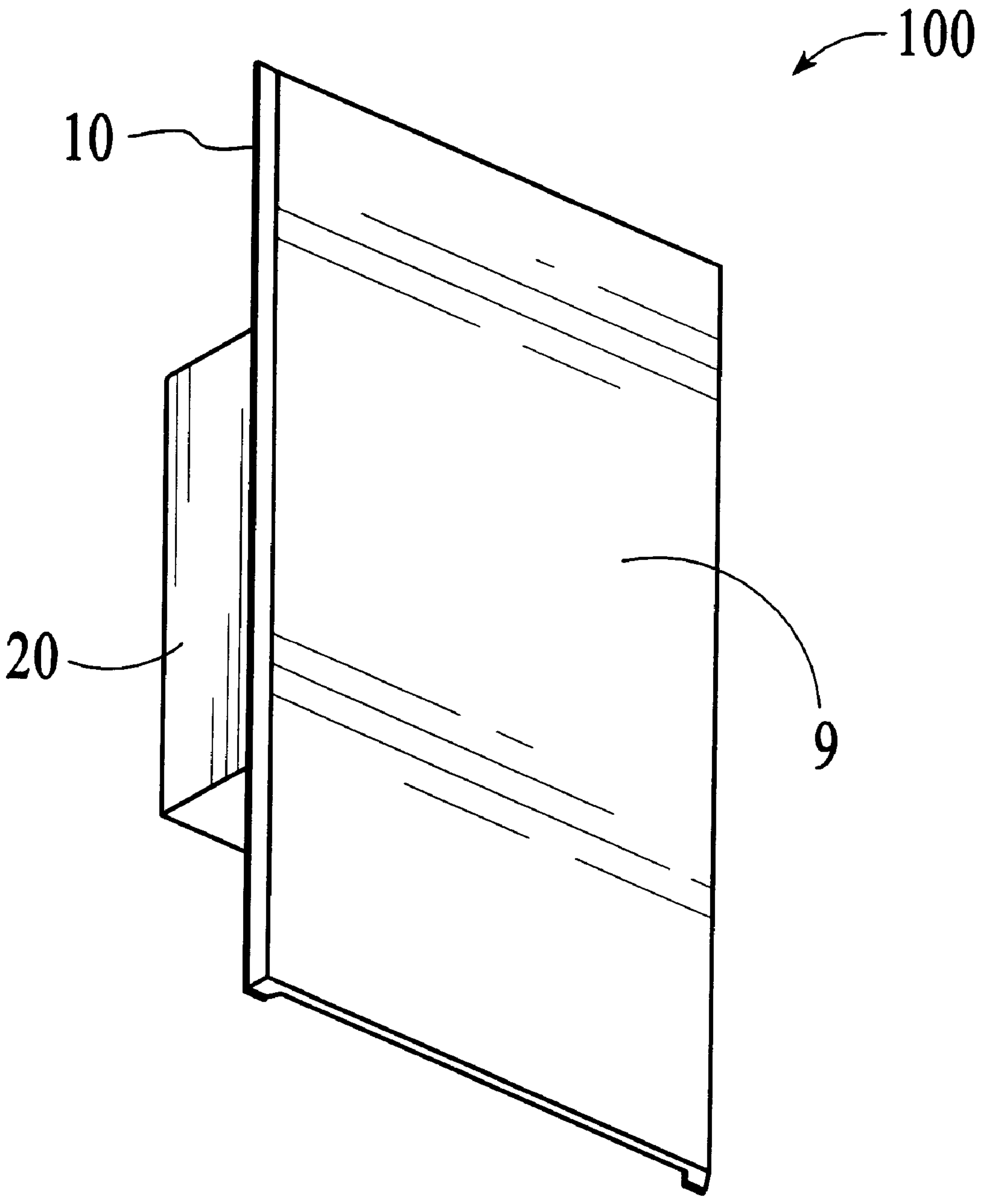
FIG. 1 is a side elevational view of the present invention.
Figure 2:
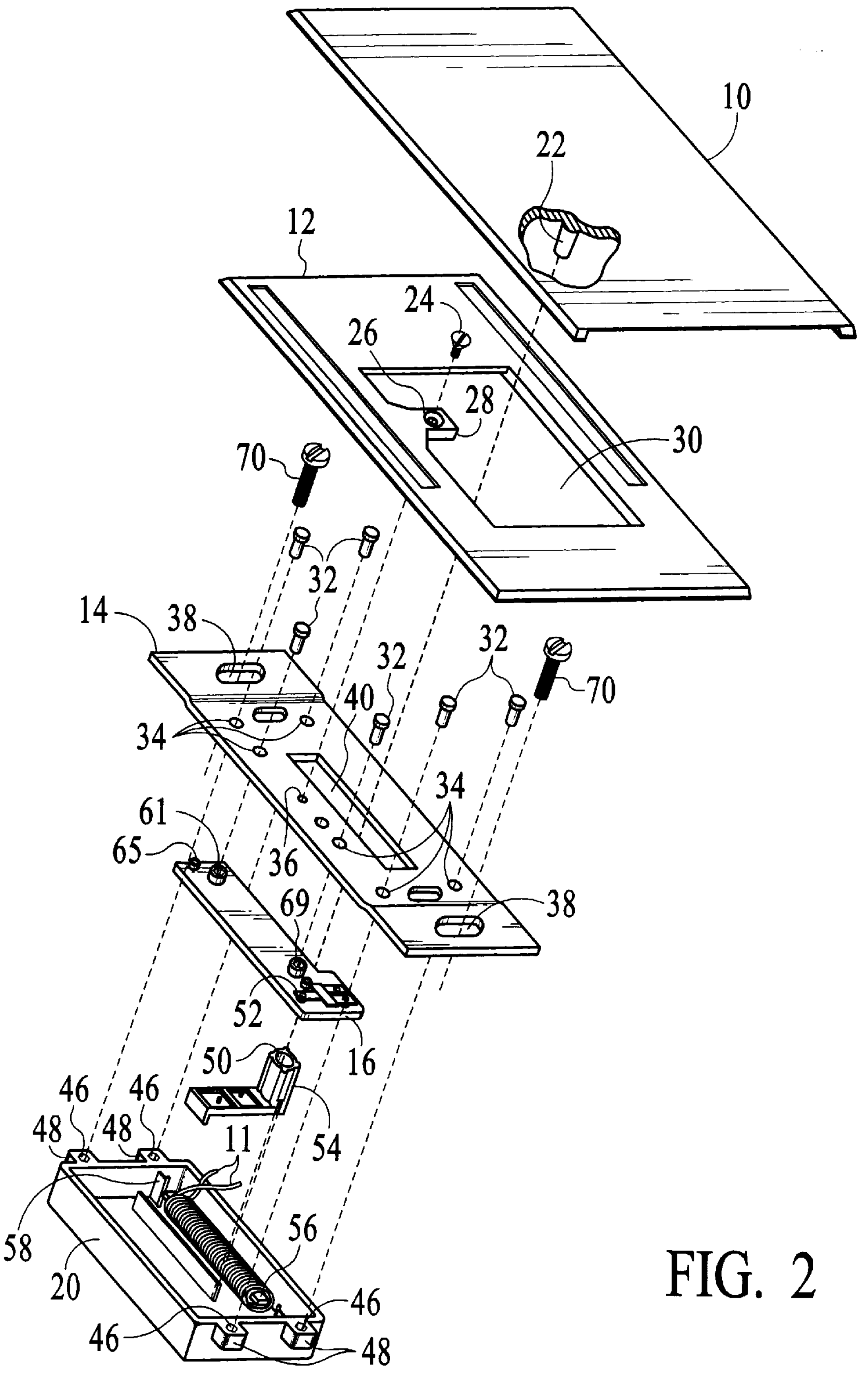
FIG. 2 is a perspective exploded view thereof.
Figure 3:
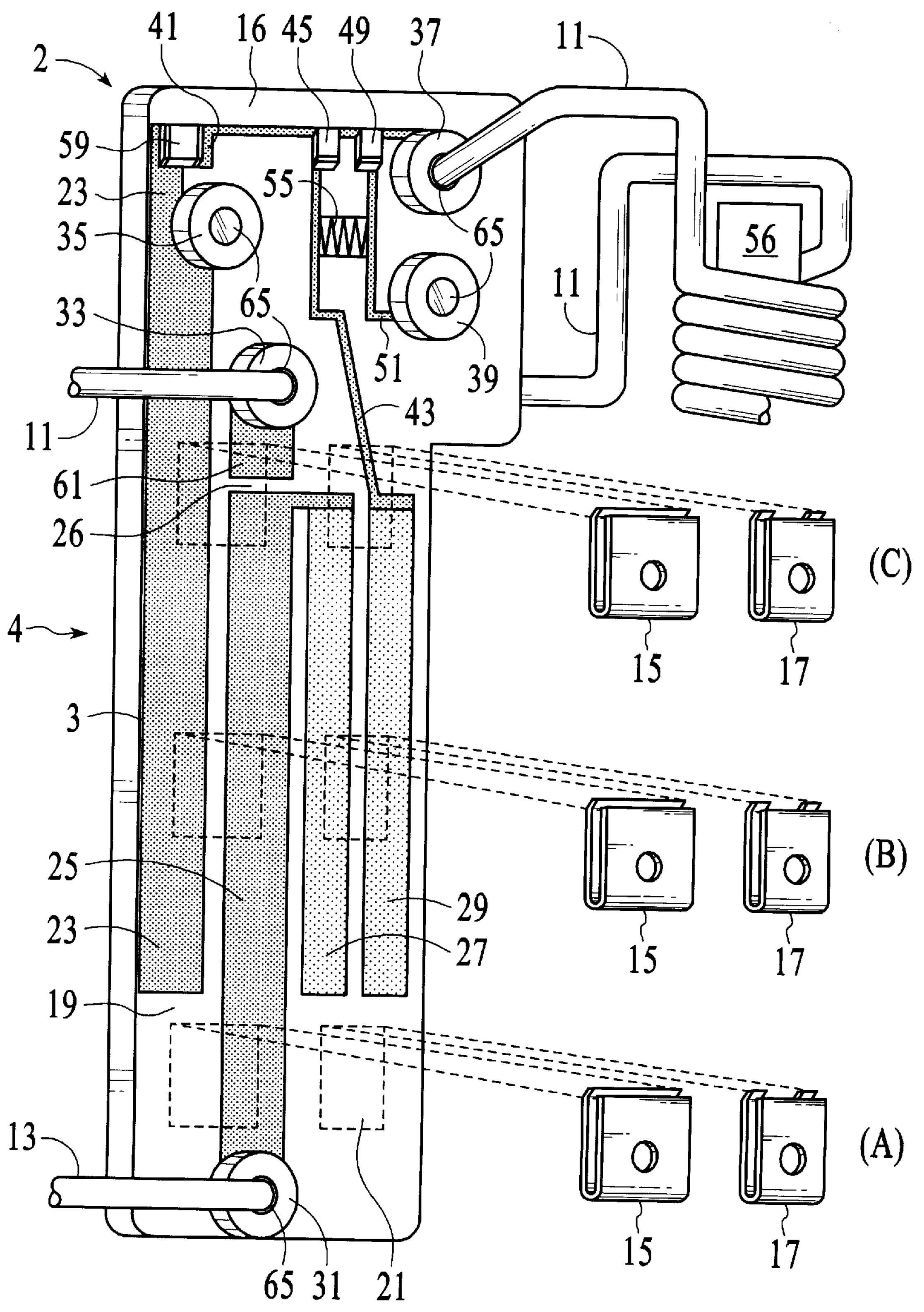
FIG. 3 is a plan view of a circuit thereof showing exploded components corresponding thereto.
Figure 4:
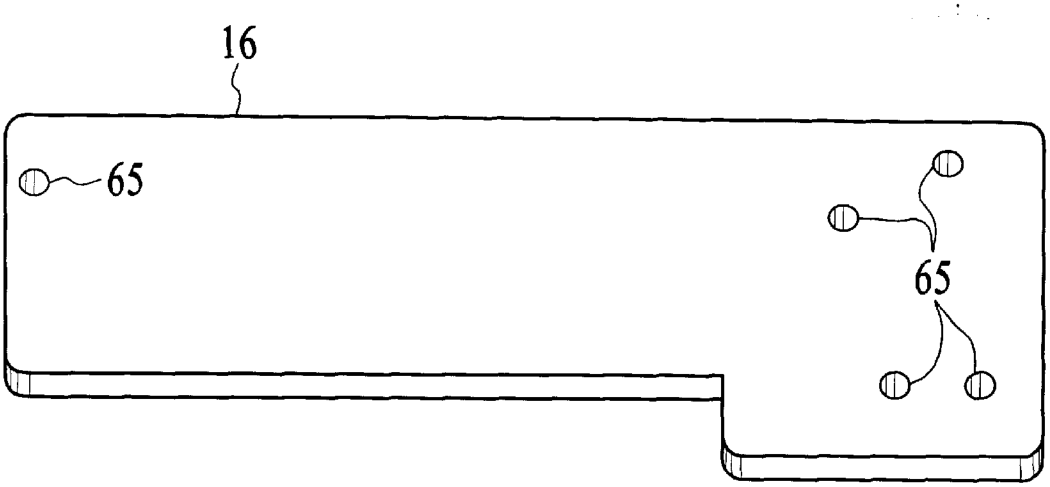
FIG. 4 is a front side of a circuit board thereof.
Figure 5:
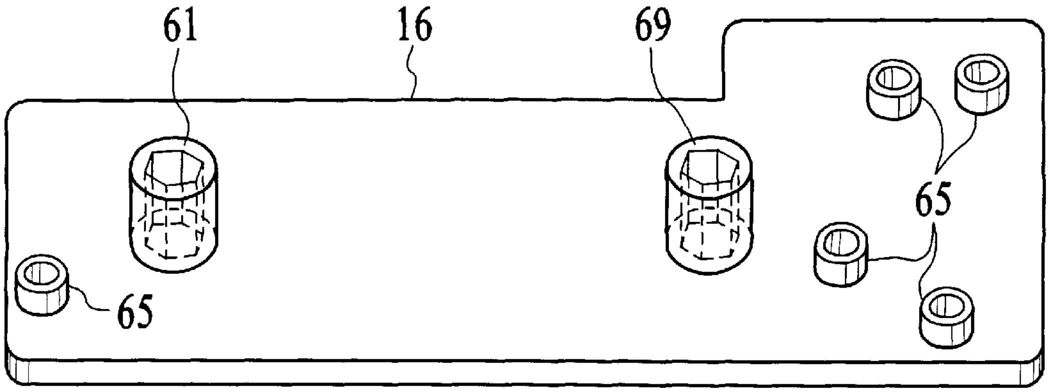
FIG. 5 is a rear side of the circuit board thereof.
Figure 6:
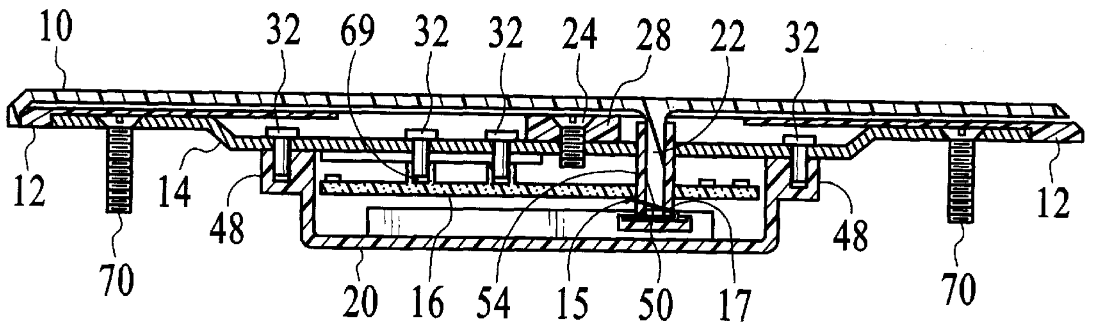
FIG. 6 is a side elevational section view thereof.
Figure 7:
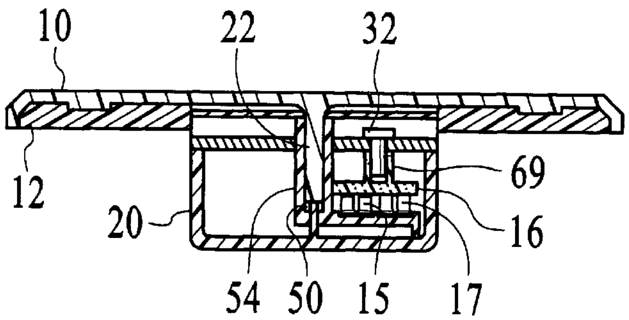
FIG. 7 is an end elevational section view thereof.

FIGS. 1 and 2 show an adjustable wall mount dimmer switch 100 with a planar switch cover plate 10 providing a flat unbroken surface 9 on one side surface thereof and a protruding actuation finger 22 on an opposing side surface. Dimmer switch 100 may be permanently affixed to a standard electrical junction box, to which a source of electrical power is connected. An incandescent lighting load 1 is wired in series with the adjustable power control by attachment to conductor elements 11 and 13 as shown in FIG. 3. The power control device 100 enables the magnitude of power provided to the lighting load 1 to be selectively varied. FIG. 3 shows a circuit assembly 2 contained on a rectangular shaped plastic circuit board 16. The circuit board 16 provides a first elevation 3 for printing PTF conductor and resistor traces, and PTF terminal locations for monolithic ceramic capacitors. Circuit board 16 also contains through holes 65 for location of eyelet vias 31, 33, 35, 37 and 39. These eyelets serve as terminals for conductors 11 and 13 and terminals for semiconductor quadrac 52 (not shown on FIG. 3) and thus comprise a circuit means 4 to furnish a selectively adjustable R-C network coupled between semiconductor quadrac 52 and input power sources 11 and 13. The selectively adjustable network 4 functions as a phase shifting network for controlling the point in the cycle of applied line voltage at which a positive or negative pulse is applied to quadrac 52 and to effect the electrical conduction and thereby control the power applied at load 1.

Figure 8:
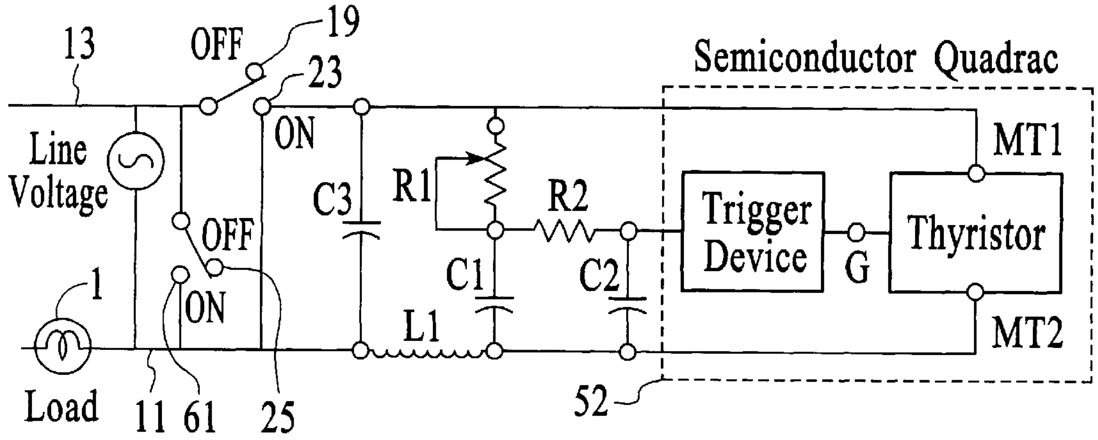
FIG. 8 is an electrical schematic diagram thereof.

The selectively variable circuit function is provided by metallic spring wipers 15 and 17 contained in slide potentiometer switching element 54, as shown in FIG. 2, coupled to cover plate 10 by interengagement of stud 22 and tubular boss 50, and held in a permanent spatial alignment between housing 20 and circuit board 16 by forced spring tension of the wipers 15 and 17. As cover plate 10 is at its lowest vertical position “A”, as shown in FIGS. 1 and 3, spring wiper 15 is in contact with conductor trace 25 only, comprising an open circuit and thus no power is delivered to the circuit. As spring wiper 15 is moved and crosses air,gap 19, it contacts conductor trace 23, the circuit is closed and voltage is applied to the circuitry, and spring wiper 17 contacts resistor traces 27 and 29 and a very low level of illumination is achieved. As spring wiper 17 is varied in its position on PTF resistor traces 27 and 29, see section “B” in FIG. 3, the resistance component of the R-C phase control network 4 is changed. The electrical output signal of the R-C network is coupled directly to semiconductor quadrac 52, so that a change in resistance value of traces 27 and 29 changes the phase of this signal to load 1, thereby varying the delivered power and output lumens. As spring wipers 15 and 17 are moved further along traces 23, 25, 27, and 29, spring wiper 15 crosses air gap 26 and contacts trace 61. See position C in FIG. 3. This shorts conductor traces 23, 25 and 61 shunting the input voltage from the R-C network 4 directly to conductors 11 and 13, supplying full voltage to load 1 for maximum illumination. Placed between conductor traces 23 and eyelet 37, monolithic capacitor 59 (component C3 in FIG. 8) is bonded to PTF conductor trace 23 and 41 to terminal 37, in conjunction with rectangular inductor 56 (component L1, in FIG. 8) establishing a highly effective radio frequency interference filter in the circuit.

The present invention also provides for a unique and lower cost assembly method over that used in prior art wall mounted dimmer switches. Circuit board 16 is permanently attached to aluminum yoke 14.by applying a small drop of either an adhesive bond or a solvent bond material into tubular bosses 61 and 69. The outside diameter of the pins 32 are constructed so that on mating to the inside diameter of tubular bosses 61 and 69, an interference fit is created and the mating of the two parts is complete without the aid of external clamping. This assembly is placed so that holes 34 of aluminum yoke 14 are aligned with holes 46 contained on extensions 48 of housing 20. A repeat of the additions of either a solvent or adhesive bonding material into the holes 46 allows the pins 32 to be inserted and fixed into holes 46. Again, the diameters of the pins and the holes are such that an interference fit is created without the aid of any clamping. The mating parts form a low cost integral and permanent assembly.

The present invention provides on the R-C network 4, one elevation for the surface mount un-encapsulated PTF resistor and conductor elements, along with monolithic capacitor elements, forming simultaneously both the final electrical and physical circuit configuration of all the circuits passive elements, and providing another elevation for the quadrac 52 to achieve both physical and electrical connection to the circuit. These connections comprise a method of achieving both lower component and labor costs to product a commercially competitive process.

While the invention has been described with reference to at least one preferred embodiment, it is to be clearly understood by those skilled in the art that the invention is not limited thereto. Rather, the scope of the invention is to be interpreted only in conjunction with the appended claims.

What is claimed is:

1. An adjustable wall mount dimmer switch apparatus which comprises a planar switch cover plate providing a flat unbroken surface on one side surface thereof and a protruding actuation finger on an opposing side surface thereof; a circuit board providing a first elevation receiving printed PTF conductor and resistor traces, and PTF terminals adapted for receiving monolithic ceramic capacitors; the circuit board further providing through holes receiving eyelet vias enabled for mounting a semiconductor quadrac; a selectively adjustable R-C network coupled between the semiconductor quadrac and an input power source; thereby establishing a phase shifting network for controlling a point in the cycle of a line voltage at which a positive or negative pulse is applied to the semiconductor quadrac to effect electrical conduction thereof for power control.

2. The apparatus of claim 1 further comprising plural metallic spring wipers contained within a slide potentiometer switching element coupled to the cover plate.

3. The apparatus of claim 2 wherein the slide potentiometer switching element is held in a permanent spatial alignment by forced spring tension of a set of wipers.

4. The apparatus of claim 3 wherein the potentiometer is movable between an open circuit position, a set of positions for low level illumination of a load, and a short circuit position for maximum illumination.

5. The apparatus of claim 1 further comprising a monolithic capacitor and an inductor establishing a high efficiency radio frequency interference filter.

6. A method of producing an adjustable wall mount dimmer switch apparatus which comprises providing a planar switch cover plate with a flat unbroken surface on one side surface thereof and a protruding actuation finger on an opposing side surface thereof; engaging the actuation finger with a circuit board providing a first elevation; engaging the first elevation with printed PTF conductor and resistor traces, and PTF terminals adapted for receiving monolithic ceramic capacitors; engaging eyelet vias in through holes of the circuit board; mounting a semiconductor quadrac in the eyelet vias; coupling a selectively adjustable R-C network between the semiconductor quadrac and an input power source; thereby establishing a phase shifting network for controlling a point in the cycle of a line voltage at which a positive or negative pulse is applied to the semiconductor quadrac to effect electrical conduction thereof for power control.

7. The method of claim 6 further comprising permanently attaching an aluminum yoke to a set of tubular bosses of the circuit board by applying one of an adhesive bond and a solvent bond material thereto.

8. The method of claim 6 further comprising providing an R-C network using un-encapsulated PTF resistor and conductor elements and monolithic capacitor elements; forming simultaneously both the final electrical and circuit configuration, and providing a further elevation of the circuit board receiving the semiconductor quadrac to achieve low component labor costs.

* * * * *